United States Patent [19]

Baker et al.

[11] Patent Number: 4,827,963
[45] Date of Patent: May 9, 1989

[54] HEAT SENSITIVE SHAFT LOCKING APPARATUS AND VALVE USING SAME

[75] Inventors: Gerald S. Baker, Houston; David R. Mefford, Katy, both of Tex.

[73] Assignee: Cameron Iron Works USA, Inc., Houston, Tex.

[21] Appl. No.: 258,492

[22] Filed: Oct. 17, 1988

[51] Int. Cl.[4] .................. F16K 17/38; F16K 31/64
[52] U.S. Cl. .......................... 137/75; 137/77; 251/14; 251/63.6; 251/297
[58] Field of Search ............... 137/72, 75, 76, 77; 251/14, 63.5, 63.6, 297, 330

[56] References Cited

U.S. PATENT DOCUMENTS

| | | | |
|---|---|---|---|
| 2,209,133 | 7/1940 | Parker | 251/297 |
| 2,209,134 | 7/1940 | Parker | 251/297 |
| 3,838,705 | 10/1974 | Diehl et al. | 137/75 |
| 3,842,853 | 10/1974 | Kelly et al. | 137/72 |
| 3,842,854 | 10/1974 | Wicke | 137/77 |
| 3,896,835 | 7/1975 | Wicke | 137/75 |
| 4,214,600 | 7/1980 | Williams et al. | 137/251 |
| 4,245,662 | 1/1981 | McGee | 137/75 |
| 4,260,132 | 4/1981 | Habiger | 251/297 |
| 4,421,134 | 12/1983 | Bruton et al. | 137/77 |
| 4,619,434 | 10/1986 | Snyder | 137/72 |
| 4,635,670 | 1/1987 | Kilmoyer | 137/75 |

Primary Examiner—George L. Walton
Attorney, Agent, or Firm—Vinson & Elkins

[57] ABSTRACT

The improved shaft locking apparatus includes a body with a bore therethrough and includes balls mounted in radial ports in said body so that in one position the balls partially extend into the bore and in restricting the bore lock a shaft associated with the apparatus from axial movement. A heat sensitive material is used as a part of the balls supporting means and when it is subjected to excessive heat, heat above its design limitations, its support of the balls relaxes and allows their retraction from the bore to thereby allow axial movement of the shaft. In one form of the invention the shaft extends into the bore of the annular body and the balls engage the end of the shaft to support it against axial movement and in another form a rod extension is positioned in the bore of the annular body and includes external ball receiving recesses which prevent movement of the rod extension when the balls are in engagement with such recesses and allows movement responsive to the relaxation of the ball support when exposed to excessive heat conditions, the shaft which is supported by the rod extension is then allowed to move axially responsive to the ball retractions.

7 Claims, 6 Drawing Sheets

HEAT SENSITIVE SHAFT LOCKING APPARATUS AND VALVE USING SAME

BACKGROUND

The present invention relates to an improved shaft locking device which may be used to lock the shaft of a valve in one position and when it is subjected to fire or other excessive heat it releases the shaft to allow it to move to a safe position, for example, to a position in which the gate of the valve is closed. Further, this invention can have application to other shafts which are desired to be held in one position during normal operations and can be released from the locked position either manually or in response to fire or excessive heat.

In U.S. Pat. No. 4,214,600 it is suggested to support the bearings of a gate valve stem with a bushing of heat responsive material, such as eutectic material, which when subject to the heat releases the bearing support so that the stem moves outwardly to a position in which a shoulder on the stem back seats against a shoulder on the bonnet or body surrounding the stem to close against leakage out of the valve around the stem.

It is further known to have a shaft with a groove in its exterior surface and a sleeve surrounding the shaft having ports extending therethrough with a tubular actuator surrounding the sleeve to engage balls in the ports and hold them against the groove in the shaft and partially in the ports so that the sleeve and shaft are locked against axial movement with respect to each other.

SUMMARY

The improved shaft locking apparatus includes a tubular body having a bore therethrough, a counterbore concentric with the bore, ports extending radially through said body in communication with the interior of said bore and connecting means in the counterbore, a ring surrounding the portion of said body surrounding said bore, a plurality of balls positioned in said ports, stop means surrounding the inner opening of said ports into said bore to allow movement of said balls into a position partially blocking said bore and partially in said ports, a shaft positioned in said body bore and having surfaces in engagement with said balls to restrain its movement through said bore, means carried by said ring to retain said balls in their inner position partially blocking said bore, said ball retention means including heat responsive material supporting said retention means to allow said retention means to relax its engagement of said balls when subject to excessive heat and to thus allow movement of said balls out of said bore back into said ports and to thereby release said shaft for movement through said bore. The ring is secured to the body and manually rotatable with respect to the body to bring internal recesses in the ring into registry with the ports to allow the balls to move out of positions partially blocking the bore. In another form of the invention, an annular body surrounds a rod extension which has recesses around its exterior and balls positioned in ports in the annular body and held in such position by a heat responsive means engaged in the recesses to prevent the rod extension from sliding through the interior of the annular body. In this form of the invention the rod extension is adapted to be engaged by the valve stem or other shaft which is to be locked against movement. These devices are applicable for connection on the bonnet of a valve in surrounding relationship to the valve stem with the outer end of the stem in engagement with the balls or the rod extension so that when subjected to fire or excessive heat the stem moves outwardly to change the position of the gate, to back seat the stem or both, if desired.

An object of the present invention is to provide an improved shaft locking device which mechanically locks the shaft and allows complete freedom of movement of the shaft when released.

Another object of the present invention is to provide an improved shaft locking device suitable for use on a valve stem which when released provides an unrestricted diameter bore through which the stem moves.

A further object is to provide an improved shaft locking device which on release does not require movement of structure other than the locking balls and the shaft.

BRIEF DESCRIPTION OF THE DRAWINGS

These and other objects and advantages of the present invention are hereinafter set forth and explained with reference to the drawings.

DESCRIPTION OF THE PREFERRED EMBODIMENT

Figure 1:
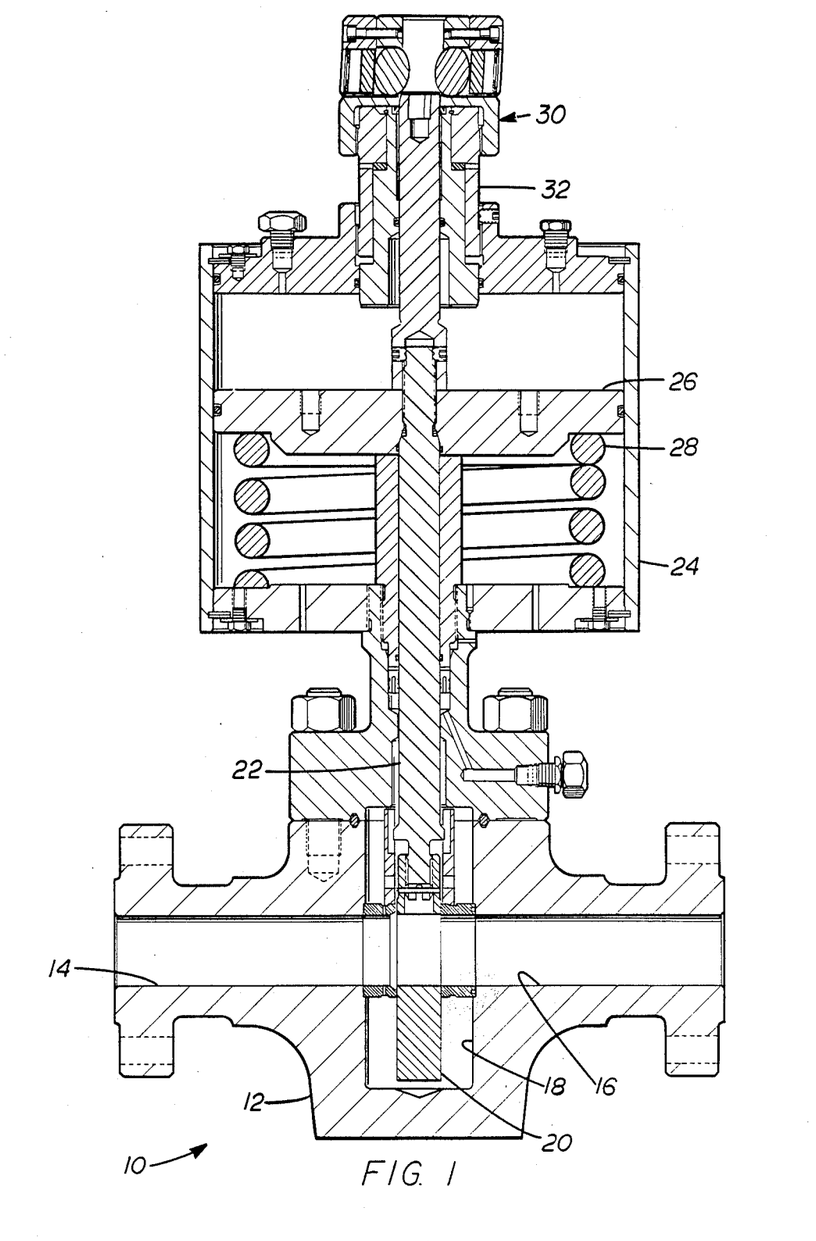
FIG. 1 is a sectional view of an improved valve having the improved shaft locking apparatus thereon with the shaft in locked position.
Figure 2:
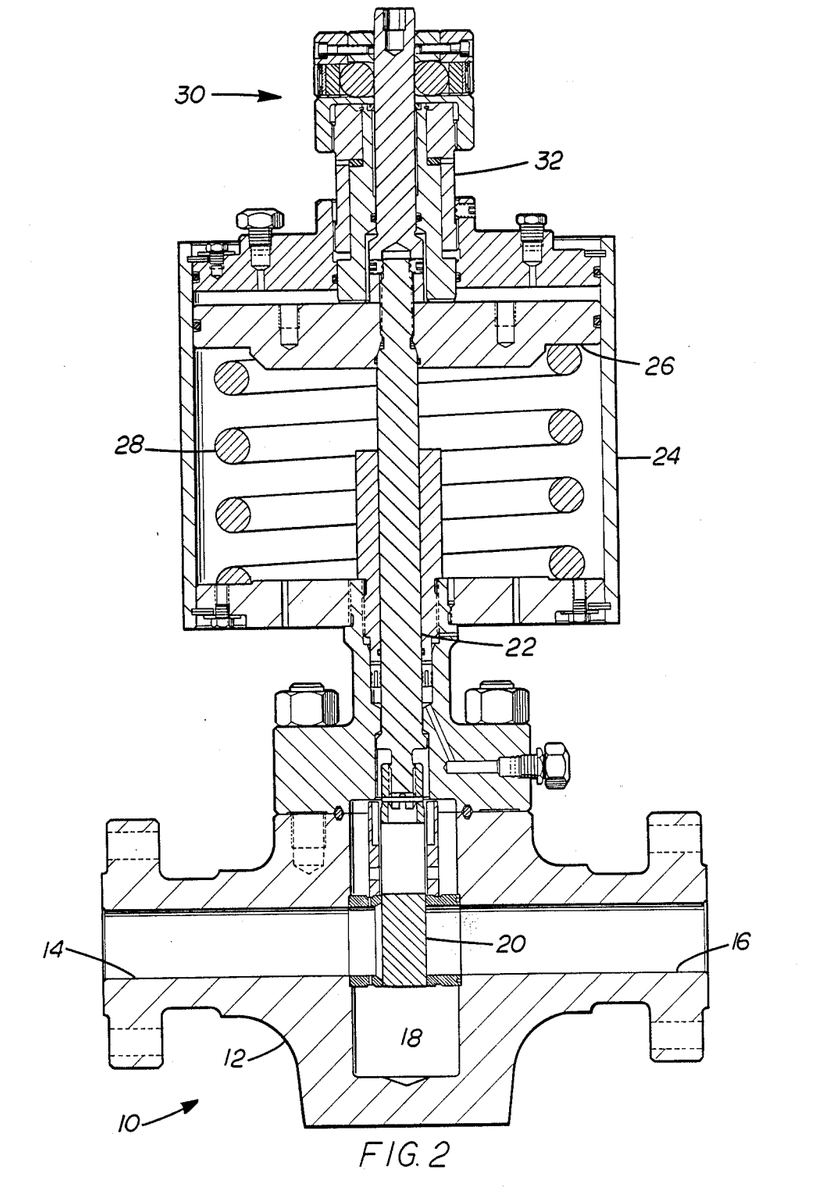
FIG. 2 is a sectional view of the valve shown in FIG. 1 with the shaft locking apparatus in its relaxed position.

Valve 10 shown in FIGS. 1 and 2 includes body 12 having inlet 14, outlet 16 and valve chamber 18 with valve gate 20 positioned in the valve chamber 18 to open or close flow through valve 10, stem 22 secured to gate 20 with actuator 24 connected to body 12 so that piston 26 connects to stem 22 and is moved downward responsive to pressure supplied to actuator 24 against the force of spring 28. Stem 22 extends out through the upper end of actuator 24 and, as shown in FIG. 1, is held in its inner or downward position by improved shaft locking device 30.

Figure 3:
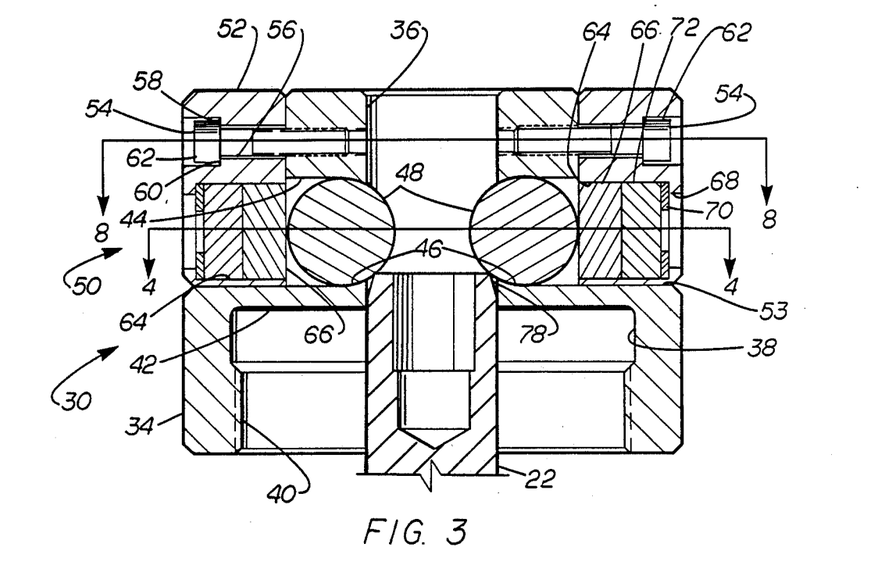
FIG. 3 is a sectional view taken axially through the shaft locking apparatus which is in its locked position.
Figure 4:
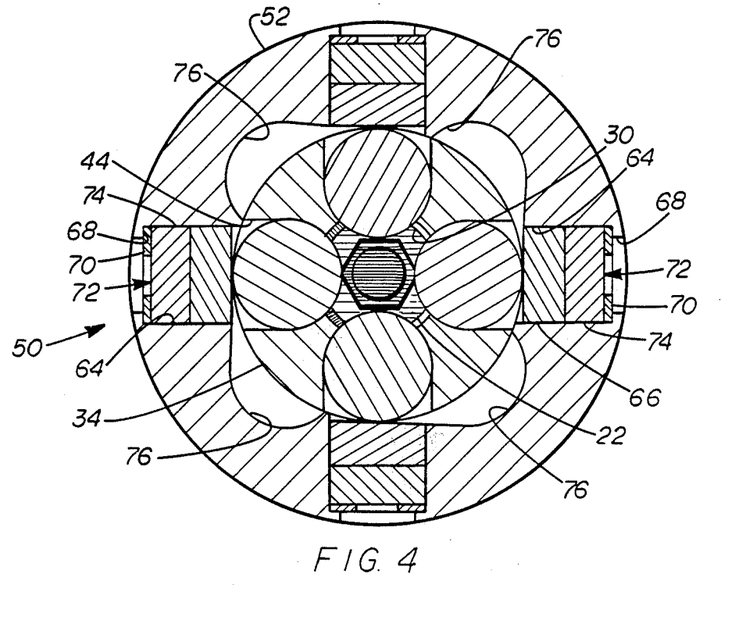
FIG. 4 is a sectional view taken along line 4—4 in FIG. 3.
Figure 8:
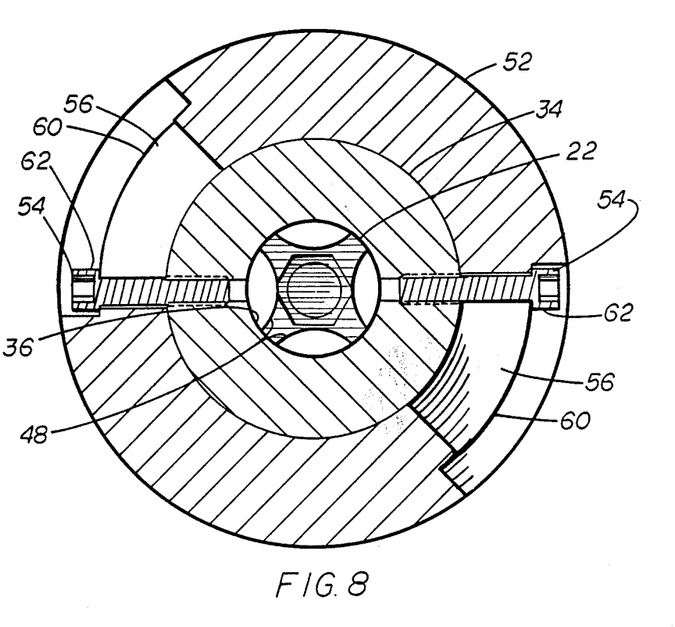
FIG. 8 is a sectional view taken along line 8—8 in FIG. 3 illustrating the rotatable connection of the outer ring to the body of the shaft locking apparatus.

Shaft locking device 30 is secured to sleeve 32 which extends from the end of actuator 24 away from body 12 with stem 22 extending therethrough into the lower portion of device 30 as hereinafter explained. Device 30 includes body 34 having bore 36 and counterbore 38 extending therethrough. Threads 40 on the interior of the open end of counterbore 38 are provided to secure device to actuator 24 by threading onto sleeve 32. Body 34 is connected to sleeve 32 by threading thereon to properly position stem 22 as hereinafter described. As best seen in FIG. 3, bore 36 is sized to allow the outer end of stem 22 to pass therethrough when device 30 is in its relaxed position as hereinafter explained. The exterior portion of body 34 around bore 36 is reduced in diameter in comparison to the exterior of the remainder of body 34. Ports 44 extend through the upper portion of body 34 to provide communication between the exterior of the upper portion of body 34 into bore 36. The inner ends of ports 44 each include shallow rim 46 extending inwardly of the ports 44 sufficiently to function as hereinafter set forth. One of balls 48 is positioned in each of ports 44. Balls 48 have a diameter which is smaller than the diameter of ports 44 by an amount to allow balls 48 to move freely in ports 44. Rims 46 are sized to allow balls 48 when in engagement with rims 46 to extend partially into bore 36 sufficiently to cause engagement of the upper end of stem 22 to prevent it from moving completely into bore 36 from its locked position as shown in FIGS. 1, 3 and 4. The threaded engagement of body 34 with sleeve 32 is sufficient to bring the outer end of stem 22 into engagement with balls 48. Means 50 is provided to releasably secure balls 48 in this position. Such securing means 50 includes ring 52 which is positioned on shoulder 53 of body 34 and around the upper reduced diameter portion of body 34 in surrounding relationship to ports 44. Machine screws 54 are positioned in segmental slots 56 in ring 52 and threaded into the upper exterior of body 34. As can be seen from FIGS. 3 and 8, slots 56 include upper and lower arcuate shoulders 58 and 60 against which the underside of heads 62 of screws 54 engage. This structure of ring 52 allows it to be manually rotated with respect to body 34. Ports 64 extend radially through ring 52 in the position in registry with ports 44 through body 34 as shown in FIGS. 3 and 4. Support discs 66 are positioned in the inner ends of ports 64 to be in engagement with balls 48 when balls 48 are in engagement with shallow rims 46 in their locked position. The outer ends of ports 64 include inwardly directed rims 68 against which washers 70 are positioned. Fire responsive relaxation means 72 is positioned between supports discs 66 and washers 70. Such means 72 includes disc 74 of a material which either melts or otherwise greatly reduces the volume which it occupies between support discs 66 and washers 70 responsive to excessive heat or a fire. A typical material which has found to be successful to provide the desired relaxation means 72 is a metal eutectic which melts at a relative low temperature without being prone to excessive creep. A solder material has been found to be acceptable. It is also believed that there are plastic materials which degrade or turn to powder responsive to heat that may be used as the material for disc 74.

Figure 6:
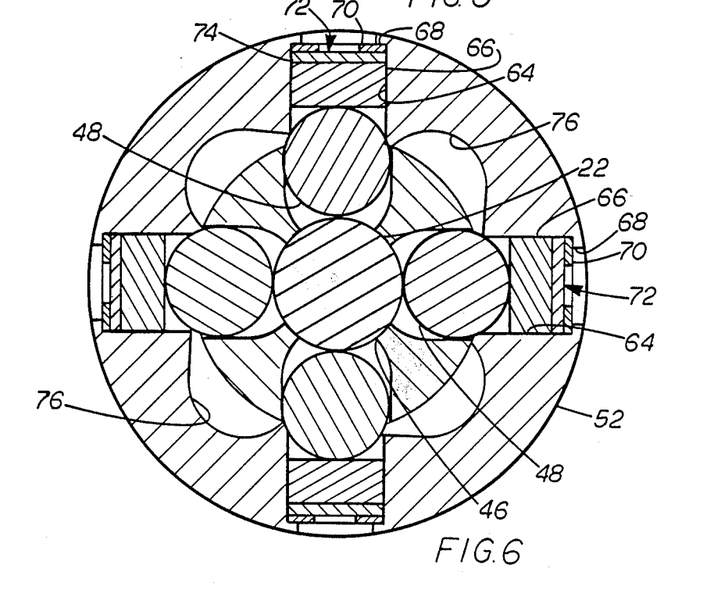
FIG. 6 is a sectional view taken along line 6—6 in FIG. 5.
Figure 7:
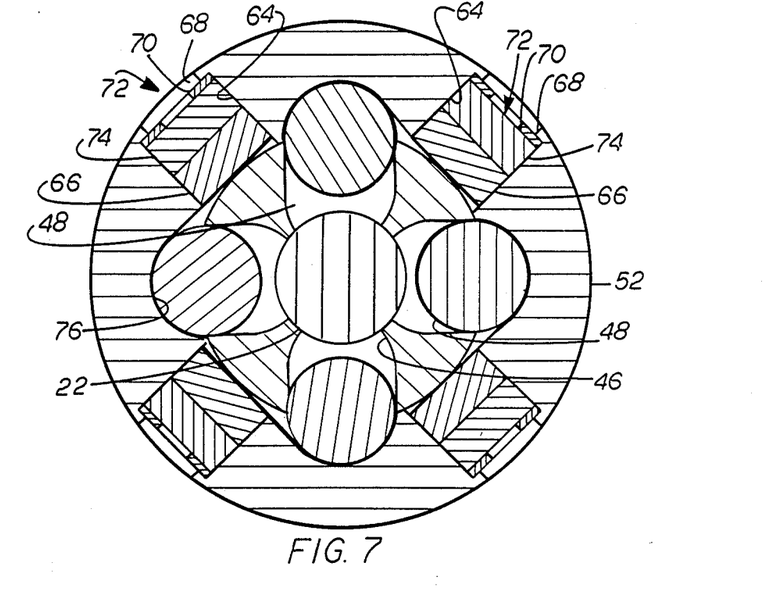
FIG. 7 is another sectional view similar to FIG. 3 but illustrating the position of the shaft locking apparatus in its manual released position.

The interior of ring 52 includes arcuate recesses 76 between ports 64 as shown in FIGS. 4, 6, and 7. The function of recesses 76 is to provide a relief to the support of balls 48 allowing the manual release of stem 22 to either cause gate 20 to be moved in an emergency or to test the operation of valve 10. This is accomplished by the rotation of ring 52 so that screws 54 are positioned at the opposite ends of slots 56 which positions internal ring recesses 76 in registry with ports 44 through body 32. This allows balls 48 to retract into recesses 76 and out of their locked positions partially within bore 36. The upper end of stem 22 includes an outer taper 78 which has an upper edge engaging the balls 48 at a position displaced inwardly from their centers so that the force of spring 28 causes balls 48 to be cammed outwardly into internal recesses 76 and release stem 22 from its locked position.

Figure 5:
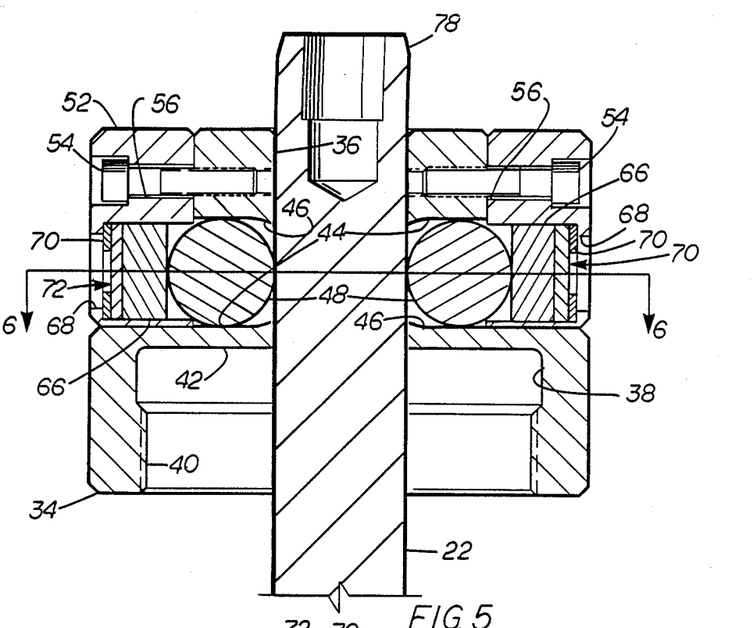
FIG. 5 is a sectional view similar to FIG. 3 but showing the shaft locking apparatus in its relaxed position.

The same situation results when sufficient heat or a fire is encountered which is sufficient to greatly reduce the volume of discs 74 so that the force of spring 28 exerted by stem 22 on balls 48 moves balls and support discs 66 outwardly. This moves balls 48 from their locking position within bore 36 to allow stem to move upwardly therethrough to the position shown in FIGS. 2 and 5.

Figure 9:
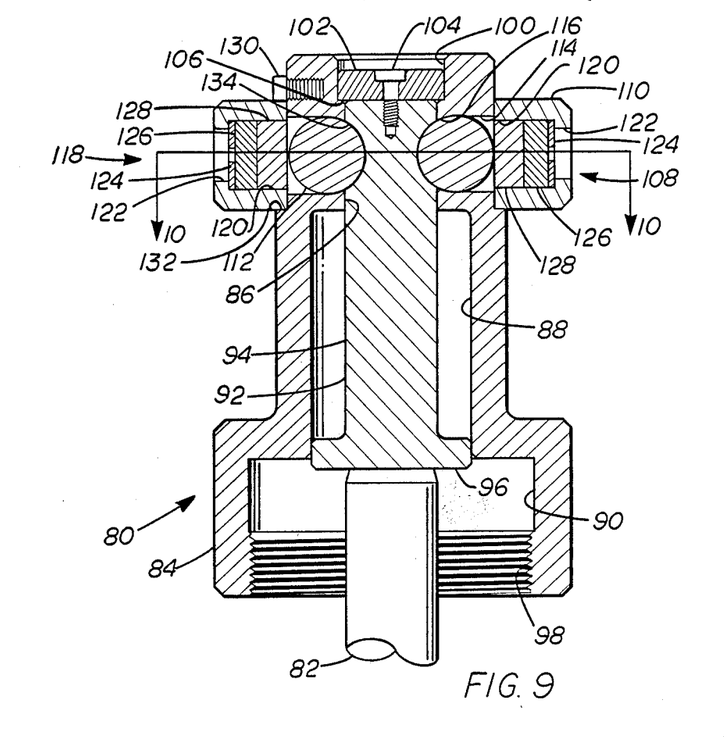
FIG. 9 is a sectional view of a modified form of the present invention shown in its shaft locking position.
Figure 10:
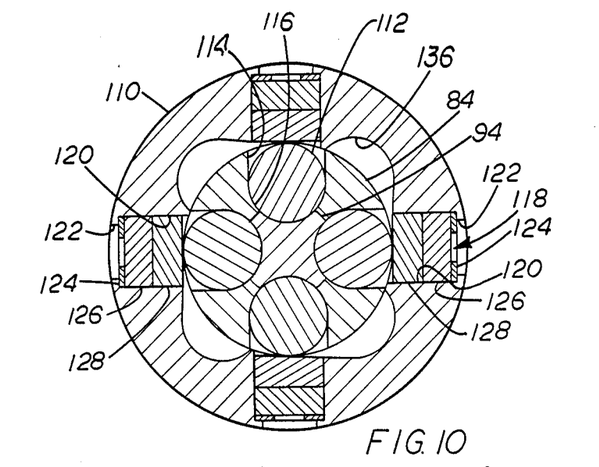
FIG. 10 is a sectional view taken along line 10—10 in FIG. 9.

Shaft locking apparatus 80 shown in FIGS. 9 and 10 is a modified form of the present invention which is generally preferred over the type previously described since it provides a larger contact surface between the locking elements and the shaft extension that in the apparatus illustrated in FIGS. 1 through 8. Shaft locking apparatus 80 is shown together with shaft 82 which it is designed to control but the structure to which it is to connect, such as the valve sleeve 32 shown in FIGS. 1 and 2, is not shown for purposes of clarity. Locking apparatus 80 includes body 84 having bore 86, first counterbore 88, second counterbore 90 with rod extension 92 having cylindrical body 94 and flange 96. Rod extension 92 is positioned with the end of its body 94 within bore 86 and its flange 96 within first counterbore 88. Connecting means, such as threads 98, are provided on the interior of second counterbore 90 for connecting to the structure with which shaft 82 is associated. Third counterbore 100 in body 84 extends into the opposite end of body 84 from counterbores 88 and 90. Plate 102 is secured to the end of rod extension 92 positioned in bore 86 by screw 104 and has a diameter larger than bore 86 but sufficiently small to allow it to move freely in third counterbore 100. Plate 102 is positioned against shoulder 106 between bore 86 and third counterbore 100 when rod extension 92 is in its locked position as shown in FIGS. 9 and 10.

Locking means 108 surrounds the portion of body 84 surrounding bore 86 and includes ring 110, balls 112 positioned within ports 114 extending radially through body 84 into bore 86 and terminating in stop rim 116 to limit the inward movement of balls 112 through ports 114, and ball supporting means 118 positioned within ports 120 extending radially through ring 110. Ball supporting means 118 includes flange 122 extending into each of ports 120 at the exterior of ring 110, washer 124 positioned against flange 122, heat responsive disc 126 positioned against the inner side of washer 124 and support disc 128 positioned between heat responsive disc 126 and ball 112. Pin 130 is threaded into the exterior of body 84 above ring 110 to retain ring 110 in its position surrounding body 84 between external shoulder 132 and pin 130. When balls 112 are in their locked position, they are against stop rims 116 and extend inward into the interior of bore 86 and engage ball recesses 134 on the exterior of rod extension 92. In this position balls 112 are held in this position and prevent axial movement of rod extension 92 so that shaft 82 is locked against upward axial movement as shown in FIG. 9. Recesses 136 are provided on the interior of ring 110 as can be seen from FIG. 10 so that manual release of the support of balls 112 from engagement with rod extension 92 can be provided.

While the partial spherical shape of ball recesses 134 is the preferred form of the engagement of balls 112 with rod extension 92, it should be understood that they could engage satisfactorily in a groove extending around the exterior of rod extension 92 at the desired location.

The operation of shaft locking apparatus 80 is similar to apparatus shaft locking apparatus 30 in that rod extension 92 is restrained against axial movement by the positioning of balls 112 within the recesses 134. When the apparatus 80 is subjected to excessive heat or fire conditions, the means 108 supporting balls 112 relaxes its support and balls 112 are free to move out of their locked position. Normally, such movement is responsive to an axial shaft loading on the shaft which allows rod extension to cam balls 112 radially outward in their ports 114 whenever their support is relaxed.

The rotation of ring 110 allows manual release of the locked position of balls 112 within rod extension recesses 134. Ring 110 is held in position around annular body 84 and against shoulder 132 by pins 130 but is free to be rotated thereon to bring internal ring recesses 136 into registry with ball ports 114 to thus allow manual relaxation of balls 112 from their locked position.

What is claimed is:

1. A heat sensitive shaft locking apparatus comprising
 a shaft,
 an annular body having a bore extending axially therethrough,
 a plurality of ports extending through said body in communication between said bore and the exterior of said body,
 a ball positioned in each of said ports,
 for allowing only the inner ends of said ports allowing a portion of the balls to extend into said bore a sufficient distance to restrict the opening through the bore,
 a ring positioned in surrounding relationship to said body,
 means supported by said ring for engaging the balls to retain them in their position restricting said bore,
 said support means including a material responsive to heat whereby said support means relaxes its support of said balls for allowing them to move away from the inner ends of the ports and out of said bore,
 said shaft normally positioned within said annular body and being retained against movement by the partial restriction of said bore by said balls and allowed to move axially by the movement of said balls out of said bore responsive to conditions of excess heat and, wherein said ring includes, a plurality of internal recesses between said port recesses, means mounting said ring around said annular body so that it can be rotated manually thereon to bring said internal recesses into registry with said ball ports to allow said balls to retract from said bore whereby said shaft is released for axial movement by the manual rotation of said ring.

2. A heat sensitive shaft locking apparatus according to claim 1 wherein
 said shaft normally positioned partially within said bore and having its end engaging said balls which prevents passage of said shaft through the bore and when said support means is subjected to excessive heat conditions and relaxes its support of said balls, the balls retract out of said bore and allow passage of said shaft therethrough.

3. A heat sensitive shaft locking apparatus according to claim 1 including
 a rod extension positioned within said bore and having at least one recess for receiving said balls in their locked position of being partially within said bore,
 said shaft being in engagement with one end of said rod extension whereby locking of said rod extension by said balls prevents axial movement of said shaft and retraction of said balls out of said bore allows axial movement of said shaft.

4. A heat sensitive shaft locking apparatus according to claim 1 wherein said ball retention means includes
 a port extending through said ring for each of said balls and being in registry with the ports in which the ball is positioned, i a support disc engaging said ball positioned in said ring port,
 a heat sensitive disc positioned in supporting engagement to said support disc and relaxing its supporting engagement of said support disc responsive to excessive heat conditions, and
 means in said ring port for supporting said heat sensitive disc in supporting engagement to said support disc during normal operation and providing a path for the relaxation of said heat sensitive disc during conditions of excessive heat.

5. A valve comprising
 a body having an inlet, an outlet, and a valve chamber therebetween and having an opening through said body,
 a bonnet secured to said body and closing the opening of said valve chamber through said body,
 a valve member positioned in said valve chamber and having a stem extending through said bonnet,
 said valve member coacting with said inlet and said outlet to block flow therebetween in one of its positions and to allow flow therebetween in its opposite position,
 an annular body having a bore extending axially therethrough and secured to said bonnet in surrounding relationship to the outer end of said stem,
 a plurality of ports extending through said body in communication between said bore and the exterior of said annular body,
 a ball positioned in each of said ports,
 retaining means at the inner ends of said ports for allowing only a portion of the balls to extend into said bore a sufficient distance to restrict the opening through the bore,
 a ring positioned in surrounding relationship to said annular body,
 means supported by said ring for engaging the balls to retain them in their position restricting said bore,
 said support means including a material responsive to heat whereby said support means relaxes its support of said balls for allowing them to move away from the inner ends of the ports and out of said bore,
 said stem normally positioned within said annular body and being retained against movement by the partial restriction of said bore by said balls and allowed to move axially by the movement of said balls out of said bore responsive to conditions of excess heat and, wherein said ring includes, a plurality of internal recesses between said port recesses, means mounting said ring around said annular body so that is can be rotated manually thereon to bring said internal recesses into registry with said ball ports to allow said balls to retract from said bore whereby said shaff is released for axial movement by the manual rotation of said ring.

6. A valve according to claim 5 wherein said stem normally positioned partially within said annular bore and having its end engaging said balls which prevents passage of said stem through the bore and when said support means is subjected to excessive heat conditions and relaxes its support of said balls, the balls retract out of said bore and allow passage of said stem therethrough.

7. A valve according to claim 5 including a rod extension positioned within said bore and having at least one recess for receiving said balls in their locked position of being partially within said bore, said stem being in engagement with one end of said rod extension whereby locking of said rod extension by said balls prevents axial movement of said stem and retraction of said balls out of said bore allows axial movement of said stem.

* * * * *